(12) United States Patent
Stoppelman (10) Patent No.: US 8,606,653 B2
(45) Date of Patent: *Dec. 10, 2013

(54) ITEM RECOMMENDATIONS

(75) Inventor: Michael Stoppelman, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/615,731

(22) Filed: Sep. 14, 2012

(65) Prior Publication Data

US 2013/0103536 A1    Apr. 25, 2013

Related U.S. Application Data

(63) Continuation of application No. 13/153,950, filed on Jun. 6, 2011, now Pat. No. 8,290,828, which is a continuation of application No. 12/979,062, filed on Dec. 27, 2010, now Pat. No. 7,979,322, which is a continuation of application No. 12/536,166, filed on Aug. 5, 2009, now Pat. No. 7,860,759, which is a continuation of application No. 11/168,561, filed on Jun. 29, 2005, now Pat. No. 7,590,562.

(51) Int. Cl.
G06Q 30/00 (2012.01)
(52) U.S. Cl.
CPC ................... *G06Q 30/631* (2013.01)
USPC ........................................ 705/26.7
(58) Field of Classification Search
USPC ........................................ 705/26.7
See application file for complete search history.

(56) References Cited

U.S. PATENT DOCUMENTS

| | | |
|---|---|---|
| 6,266,649 B1 | 7/2001 | Linden et al. |
| 7,222,085 B2 | 5/2007 | Stack |
| 7,343,326 B2 | 3/2008 | Westphal |
| 7,590,562 B2 | 9/2009 | Stoppelman |
| 7,860,759 B2 | 12/2010 | Stoppelman |
| 7,979,322 B2 | 7/2011 | Stoppelman |
| 8,290,828 B2 | 10/2012 | Stoppelman |
| 2001/0049636 A1 | 12/2001 | Hudda et al. |
| 2002/0019763 A1 | 2/2002 | Linden et al. |
| 2002/0055903 A1 | 5/2002 | Solomon |
| 2002/0161664 A1 | 10/2002 | Shaya et al. |
| 2003/0028424 A1 | 2/2003 | Kampff et al. |
| 2003/0028451 A1 | 2/2003 | Ananian |
| 2003/0163399 A1 | 8/2003 | Harper et al. |
| 2005/0071251 A1 | 3/2005 | Linden et al. |
| 2005/0192873 A1 | 9/2005 | Roche et al. |
| 2006/0129463 A1 | 6/2006 | Zicherman |
| 2006/0179045 A1 | 8/2006 | Grinsfelder et al. |

OTHER PUBLICATIONS

Business Wire, "JP Mobile to Power i2 Mobile Solution; TaylorMade-adidas Golf Marks First Customer Roll-out of i2 Mobile Solution", May 15, 2002, 3 pages.

Statement in accordance with the Notice from the European Patent Office dated Oct. 1, 2007, concerning business methods, 1 page, XP002456252.

(Continued)

*Primary Examiner* — Amee A Shah
(74) *Attorney, Agent, or Firm* — Harrity & Harrity, LLP (57) ABSTRACT

A system gathers user behavior data from a group of web retailers and/or non-web retailers, analyzes the user behavior data to identify product recommendations for products offered by the web retailers, and provides one of the identified product recommendations in connection with a product page associated with one of the web retailers.

20 Claims, 11 Drawing Sheets

(56) References Cited

OTHER PUBLICATIONS

Supplementary European Search Report corresponding to EP 06 78 5845, mailed Jul. 2, 2010, 7 pages.
Asim et al., "Internet Recommendation Systems", JMR, Journal of Marketing Research, Chicago, Aug. 2000, vol. 37 issue 3, p. 363.
International Search Report/Written Opinion for corresponding PCT Application No. PCT/IB2006/025369, dated Sep. 5, 2007, 8 pages.
Amazon.com: DVD: 24-Seasons 1-3; www.amazon.com; Apr. 26, 2005 (print date) 1 page.
Barnes&Noble.com—My Life; www.barnsandnoble.com; Apr. 26, 2005 (print date) 1 page.
Amazon.com: Electronics: Apple 20 GB iPod M9282LL/A; www.amazon.com; May 3, 2005 (print date) 2 pages.

CRH BOOKSTORE

Harnessing the Rage
Dr. Bruce Banner

Format: Hardcover
Publication Date: January 11, 2004
Publisher: Robert Hastings, Inc.
CRH Bookstore Ranking: 1,459
List Price: ~~$199.95~~
 Price: $14.95 (SAVE $185.00!!)
Availability: Delivery in 3 days or less

Customers who were interested in this item were also interested in:

- We are All Supermen, Clark Kent
- Spinning a Web of Lies, P. Parker
- A Wonder-"full" Woman, Diana Prince
- My Secret Identity, Richard Grayson

| PRODUCT NAME 510 | RECOMMENDED PRODUCTS 520 |
|---|---|
| CREST MULTICARE COOL MINT TOOTHPASTE (512) | DIAL DEODORANT SOAP<br>GLIDE TAPE ORIGINAL<br>REACH PERFORMANCE TOOTHBRUSH<br>CLAIROL HERBAL ESSENCES |
| CREST MULTICARE TOOTHPASTE (514) | DIAL DEODORANT SOAP<br>GLIDE TAPE ORIGINAL<br>REACH PERFORMANCE TOOTHBRUSH<br>CLAIROL HERBAL ESSENCES |
| CREST TOOTHPASTE (516) | DIAL DEODORANT SOAP<br>GLIDE TAPE ORIGINAL<br>REACH PERFORMANCE TOOTHBRUSH<br>CLAIROL HERBAL ESSENCES |
| PRODUCT | PRODUCT(S) RECOMMENDED FOR THIS PRODUCT |
| ... | |

ITEM RECOMMENDATIONS

RELATED APPLICATIONS

This application is a continuation of U.S. patent application Ser. No. 13/153,950, filed Jun. 6, 2011, which is a continuation of Ser. No. 12/979,062, filed Dec. 27, 2010 (now U.S. Pat. No. 7,979,322), which is a continuation of U.S. patent application Ser. No. 12/536,166, filed Aug. 5, 2009 (now U.S. Pat. No. 7,860,759), which is a continuation of U.S. patent application Ser. No. 11/168,561, filed Jun. 29, 2005 (now U.S. Pat. No. 7,590,562). The entire contents of all four applications are incorporated herein by reference in their entireties.

BACKGROUND

1. Field of the Invention

Implementations described herein relate generally to electronic commerce and, more particularly, to the recommendation of products based on collaborative filtering of user data.

2. Description of Related Art

In recent years, an increasing number of retailers have begun operating on the World Wide Web ("web"). By offering products on the web, these web retailers can gain access to a much broader base of customers.

Some existing retailers provide product recommendations to their customers. For example, a retailer may track customer purchases and activities with regard to its web site and recommend products to its customers based on their purchases and activities.

Other existing retailers do not or cannot provide such product recommendations. For example, a retailer may not have the customer base (e.g., not enough customer purchases and/or activity) or the technology to provide meaningful product recommendations.

SUMMARY

According to one aspect, a method may include gathering user behavior data from a group of web retailers, analyzing the user behavior data to identify product recommendations for products offered by the web retailers, and providing one of the identified product recommendations in connection with a product page associated with one of the web retailers.

According to another aspect, a system may include means for identifying product recommendations for products offered by a web retailer based on data relating to user activity associated with a group of web retailers, and means for supplying the identified product recommendations with product pages served by the web retailer.

According to yet another aspect, a system may include a data collector to obtain information relating to user purchases from a group of web retailers, a recommended products identifier to identify a first product as a recommended product for a second product based on the information relating to user purchases, and a recommended products supplier to present the recommended product for display with a product page associated with the second product and one of the web retailers.

According to a further aspect, a method may include receiving a request from a user for recommended products associated with a product being viewed from a web site associated with a web retailer, identifying one or more recommended products for the product in a database of recommended products that was compiled from information associated with a group of web retailers, and providing the one or more recommended products to the user on behalf of the web retailer.

According to another aspect, a method may include gathering user behavior data from at least one web retailer and at least one non-web retailer; analyzing the user behavior data to identify product recommendations for products offered by a particular web retailer; and providing one of the identified product recommendations in connection with a product page associated with the particular web retailer.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Implementations consistent with the principles of the invention are directed to providing product recommendations based on collaborative filtering of user behavior data. For example, implementations described herein may leverage user behavior data associated with a group of web retailers and/or non-web retailers to provide product recommendations to users of a particular web retailer.

In one implementation, user behavior data, such as information associated with user purchases (conversions) and information associated with product pages and/or product information pages users accessed and how much time the users spent accessing the product pages and/or product information pages, may be collected with regard to many users and many web retailers and/or non-web retailers. This information may then be used to provide product recommendations to a user browsing products associated with a particular web retailer.

Figure 1:
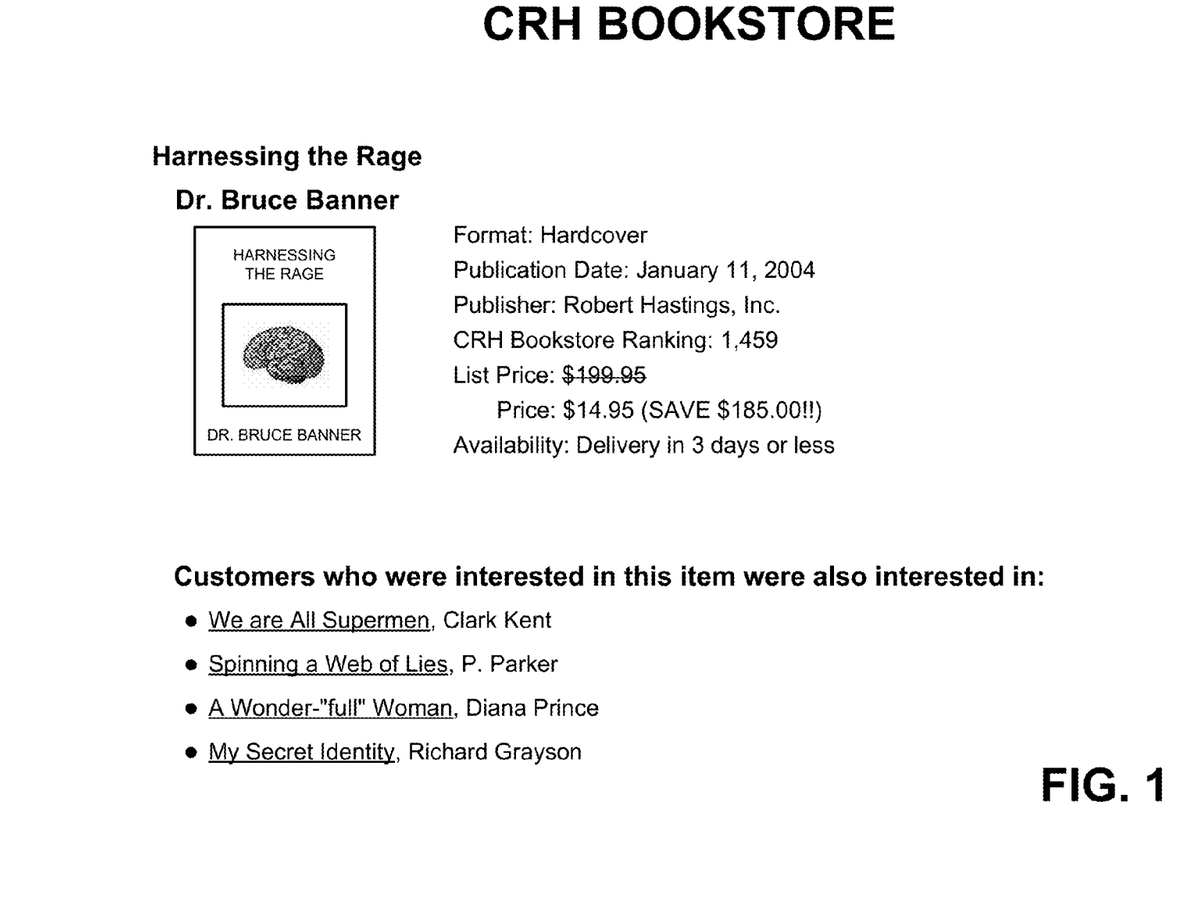
FIG. 1 is an exemplary diagram illustrating concepts consistent with the principles of the invention.

FIG. 1 is an exemplary diagram illustrating concepts consistent with the principles of the invention. As shown in FIG. 1, a user has accessed a product page associated with the web retailer CRH Bookstore. For example, the user has accessed a product page associated with a book entitled "Harnessing the Rage" by Dr. Bruce Banner. As shown, the user is provided with recommendations regarding other books sold by CRH Bookstore. The recommended books may include books that other users purchased or considered purchasing when those users purchased or considered purchasing "Harnessing the Rage." As explained above, the information used to recommend these books may be gathered not only with regard to users of the CRH Bookstore web retailer, but also with regard to users of other web retailers.

While the description to follow will generally describe the providing of product recommendations to users of web retailers, it should be understood that the description is equally applicable to the providing of recommendations associated with information and/or services to users of web retailers.

Exemplary Network Configuration

Figure 2:
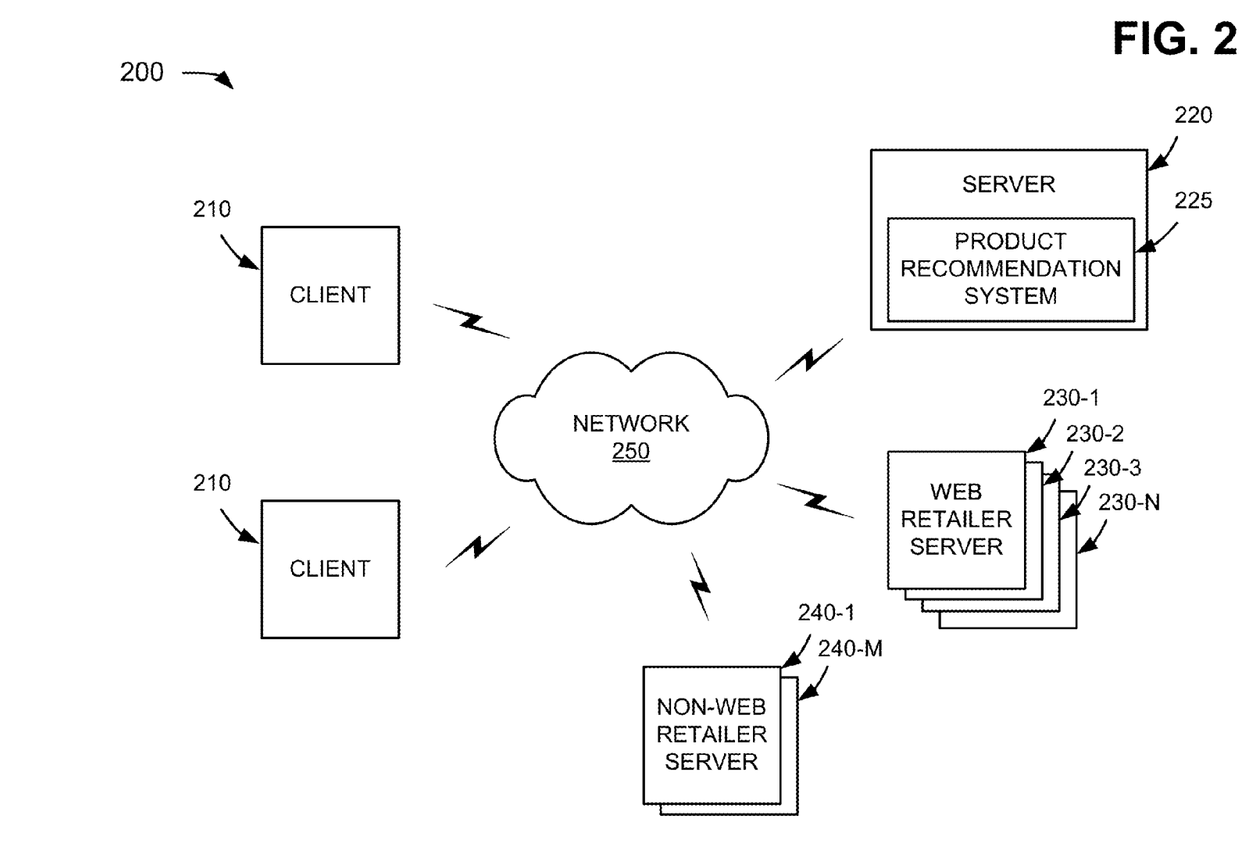
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to server 220, servers 230-1, 230-2, . . . , 230-N (collectively referred to as "servers 230"), and servers 240-1, . . . , 240-M (collectively referred to as "servers 240") via a network 250. Two clients 210, a single server 220, N servers 230, and M servers 240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain web pages in a manner consistent with the principles of the invention.

In an implementation consistent with the principles of the invention, server 220 may include a product recommendation system 225 to provide product recommendations to users of at least some of servers 230. Server 220 may gather user behavior data associated with users' activities with regard to servers 230 and/or 240 and perform collaborative filtering of the user behavior data to provide recommendation data to clients 210. Servers 230 may be associated with web retailers. Servers 230 may provide products, services, and/or information for sale, rent, or browsing by users associated with clients 210. Servers 240 may be associated with non-web retailers. Servers 240 may provide information, such as reviews, descriptions, and/or prices, regarding products, services, and/or information.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
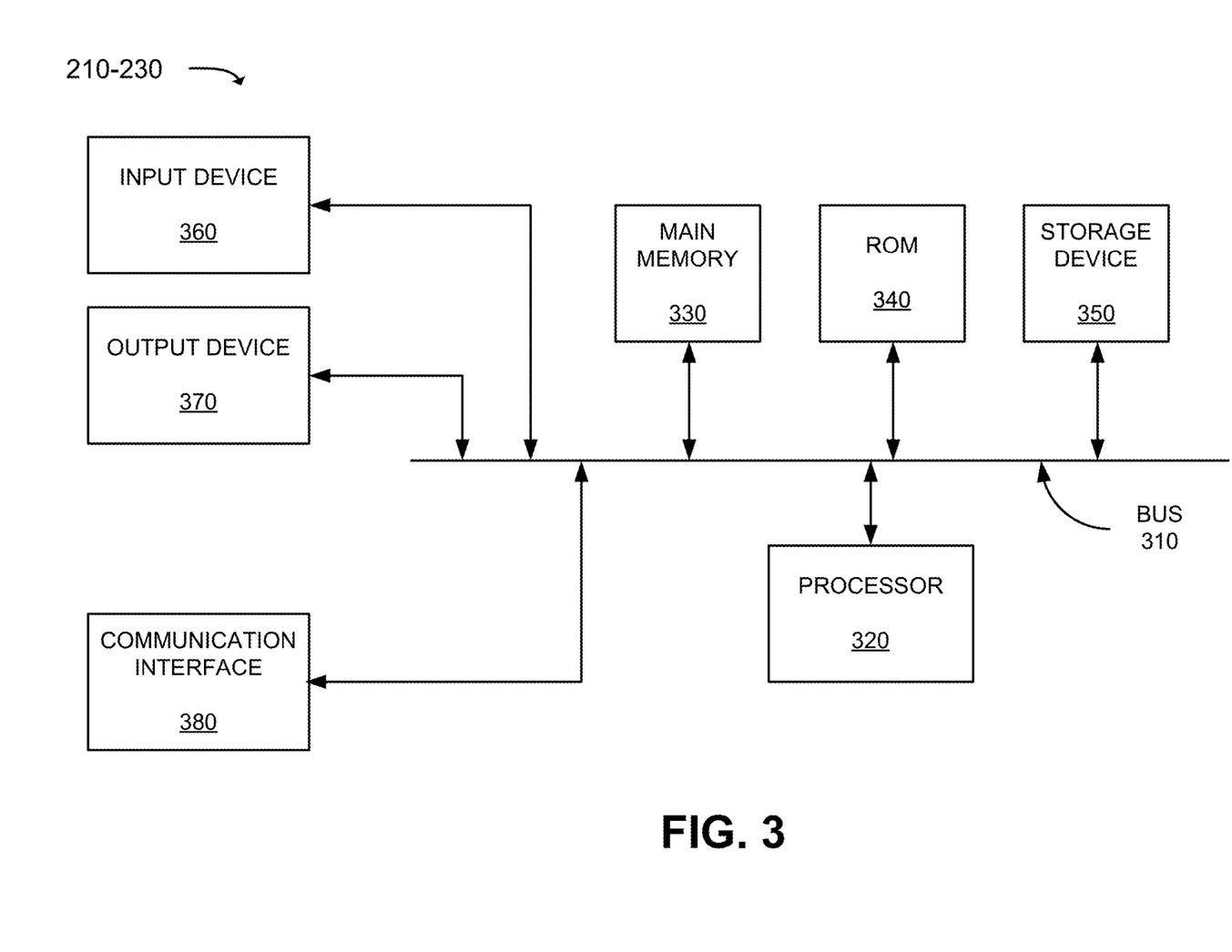
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain operations relating to the providing of product recommendations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Functional Diagram of Product Recommendation System

Figure 4:
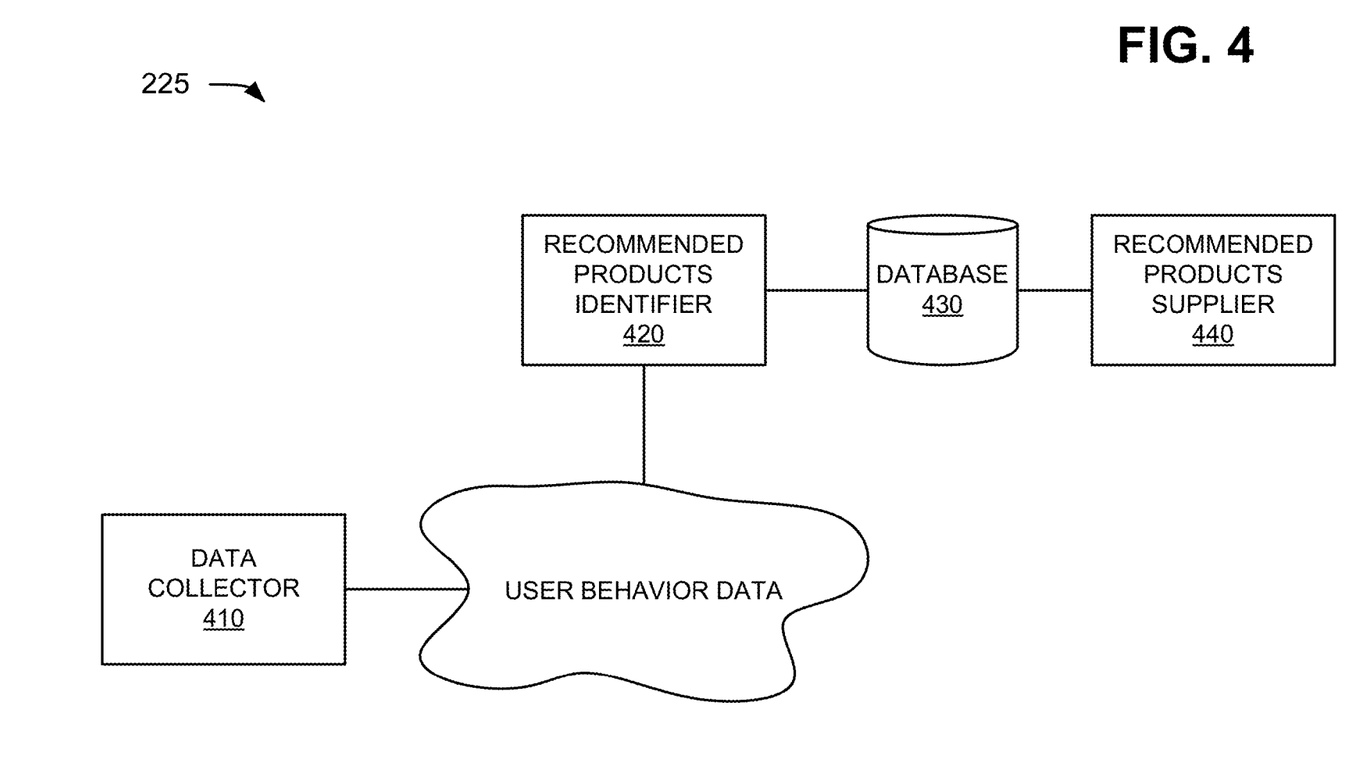
FIG. 4 is an exemplary functional block diagram of the product recommendation system of FIG. 2 according to an implementation consistent with the principles of the invention.

FIG. 4 is an exemplary functional block diagram of product recommendation system 225 (FIG. 2) according to an implementation consistent with the principles of the invention. Product recommendation system 225 may include a data collector 410, a recommended products identifier 420 connected to a database 430, and a recommended products supplier 440. In one implementation, data collector 410, recommended products identifier 420, and/or recommended products supplier 440 may be implemented as one or more components in software and/or hardware within server 220. In another implementation, data collector 410, recommended products identifier 420, and/or recommended products supplier 440 may be implemented as one or more components in software and/or hardware within another device or a group of devices separate from or including server 220.

Generally, data collector 410 may gather user behavior data and store it as a corpus of user behavior data. The user behavior data may include information relating to purchases (conversions) made by users (which may be referred to as "user purchase activity"). In one implementation, web retailer servers 230 may provide information relating to purchases (conversions) to data collector 410. In another implementation, data collector 410 may obtain information relating to purchases in another way, such as from clients 210 and/or non-web retailer servers 240. From this information, data collector 410 may identify products that users purchased together. For example, a web retailer server might inform data collector 410 that a user purchased Crest toothpaste and a Reach toothbrush during the same online session (e.g., in the same purchase transaction). Data collector 410 may store this information in the corpus.

It may be possible for different web retailer servers to label the same product differently. In this case, data collector 410 may normalize information relating to product labels or names. For example, if web retailer server A called Crest MultiCare Cool Mint toothpaste "Crest mc cm tp," web retailer server B called it "Crest mc cm toothpaste," and web retailer server C called it "Crest MultiCare Cool Mint toothpaste," data collector 410 may normalize this information to "Crest MultiCare Cool Mint toothpaste," or some other consistent variation. Alternatively, recommended products identifier 420 may normalize the information when analyzing the user behavior data to identify product recommendations.

The user behavior data may also include information relating to what product pages users accessed and how long the users spent accessing these pages (which may be referred to as "user non-purchase activity"). In one implementation, clients 210 may provide information relating to product pages users accessed and how long the users spent accessing these pages to data collector 410. For example, a client 210 may contain software, such as toolbar software, that monitors a user's web activities to assist in making the user's online experience more useful. The toolbar software may periodically provide information (e.g., Uniform Resource Locators (URLs)) relating to product pages the user accessed and how long the user spent accessing these pages to data collector 410. In another implementation, data collector 410 may obtain information relating to product pages users accessed and how long the users spent accessing these pages in another way, such as from web retailer servers 230. From this information, data collector 410 may identify products that users accessed during the same online session and/or products that the users spent a lot of time (e.g., at least a predetermined amount of time) accessing (which may infer an interest in those products) during the session. Data collector 410 may store this information in the corpus.

The user behavior data may also include information relating to what product information pages (e.g., review pages, price comparison pages, product description pages, etc.) users accessed and how long the users spent accessing these pages (which may also be referred to as "user non-purchase activity"). In one implementation, clients 210 may provide information relating to product information pages users accessed and how long the users spent accessing these pages to data collector 410. For example, toolbar software on a client 210 may periodically provide information (e.g., URLs) relating to product information pages the user accessed and how long the user spent accessing these pages to data collector 410. In another implementation, data collector 410 may obtain information relating to information pages users accessed and how long the users spent accessing these pages in another way, such as from non-web retailer servers 240. From this information, data collector 410 may identify products associated with product information pages that users accessed during the same online session and/or products associated with product information pages that the users spent a lot of time (e.g., at least a predetermined amount of time) accessing (which may infer an interest in those products) during the session. Data collector 410 may store this information in the corpus.

Recommended products identifier 420 may access the user behavior data in the corpus to identify recommended products. For example, recommended products identifier 420 may determine, for each product, what other product(s) users purchased or were interested in (e.g., spent a lot of time accessing) during the same online session. Recommended products identifier 420 may operate based on a set of thresholds, such that for product A to be considered a recommended product with regard to product B, product A must occur at least some threshold number of times in conjunction with product B. Another threshold may identify the amount of user behavior data that is needed to generate useful recommendations for a product. Yet other thresholds may be set, as necessary, to make the product recommendations meaningful to a user.

Figure 5:
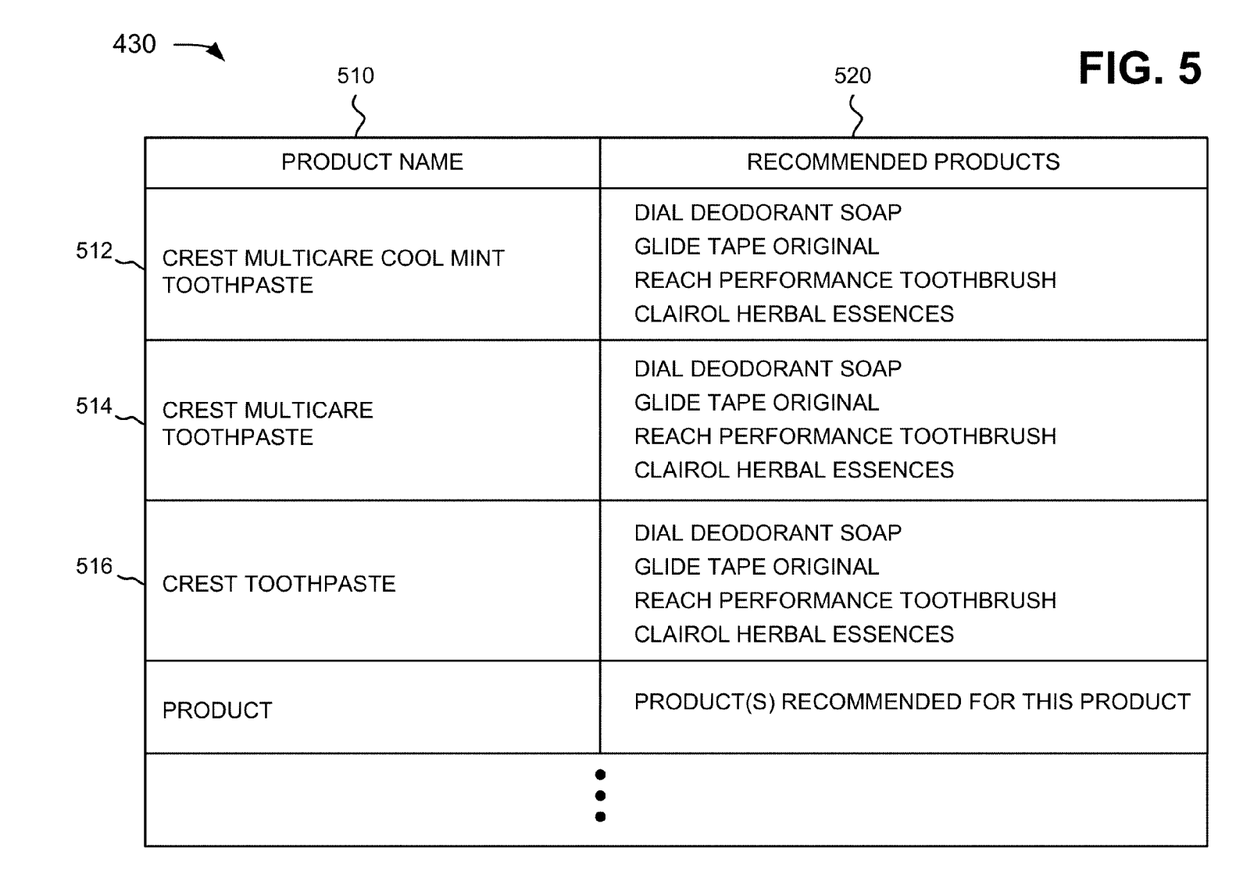
FIG. 5 is an exemplary diagram of the database of FIG. 4 according to an implementation consistent with the principles of the invention.

Recommended products identifier 420 may store information regarding products and their recommended products in database 430. FIG. 5 is an exemplary diagram of database 430 according to an implementation consistent with the principles of the invention. Database 430 may be embodied within a single memory device or within multiple (possibly distributed) memory devices. Database 430 may include a product name field 510 and a recommended products field 520.

Product name field 510 may store information relating to different products that web retailer servers 430 sell. Product name field 510 may store information relating to a product in one or more forms of specificity. For example, product name field 512 stores information about a specific type of toothpaste (Crest MultiCare Cool Mint toothpaste); product name field 514 stores more general information about a type of toothpaste (Crest MultiCare toothpaste); and product name field 516 stores even more general information about a type of toothpaste (Crest toothpaste). The particular form of specificity may be implementation-specific or based on one or more factors, such as the amount of behavior data relating to the product in the corpus.

Recommended products field 520 may list one or more products that are recommended for the product identified in product name field 510. The recommended products may include those products identified by recommended products identifier 420 as related in some manner to the product identified in product name field 510 (e.g., users purchased both products together, users were interested in one of the products when purchasing the other product, or users were interested in both products during the same online session). As shown in FIG. 5, users who purchased Crest toothpaste also purchased or were interested in Dial Deodorant soap, Glide Tape Original dental floss, Reach Performance toothbrush, and Clairol Herbal Essences shampoo.

Similar to the products in product name field 510, recommended products field 520 may store information relating to a product in one or more forms of specificity. For example, recommended products field 520 may store information about a specific type of product (e.g., Glide Tape Original dental floss and Reach Performance toothbrush) and/or more general information about a type of product (Dial Deodorant soap and Clairol Herbal Essences shampoo). The particular form of specificity may be implementation-specific or based on one or more factors, such as the amount of behavior data relating to the product in the corpus.

Returning to FIG. 4, recommended products supplier 440 may supply product recommendations from database 440 to clients 210 on behalf of web retailer servers 230. For example, recommended products supplier 440 may provide product recommendations for display within product pages associated with web sites of web retailer servers 230. In an alternative implementation, recommended products supplier 440 may provide product recommendations to web retailer servers 230 for inclusion on their product pages.

Exemplary Processing

Figure 6:
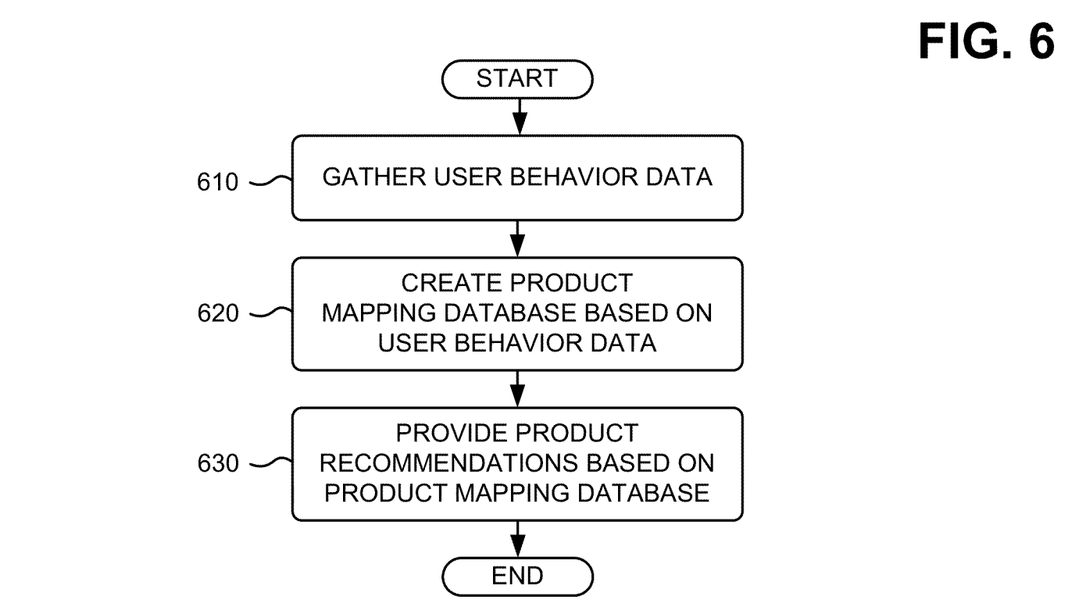
FIGS. 6 and 7 are flowcharts illustrating an exemplary operation for providing product recommendations based on collaborative filtering of user data according to an implementation consistent with the principles of the invention.
Figure 7:
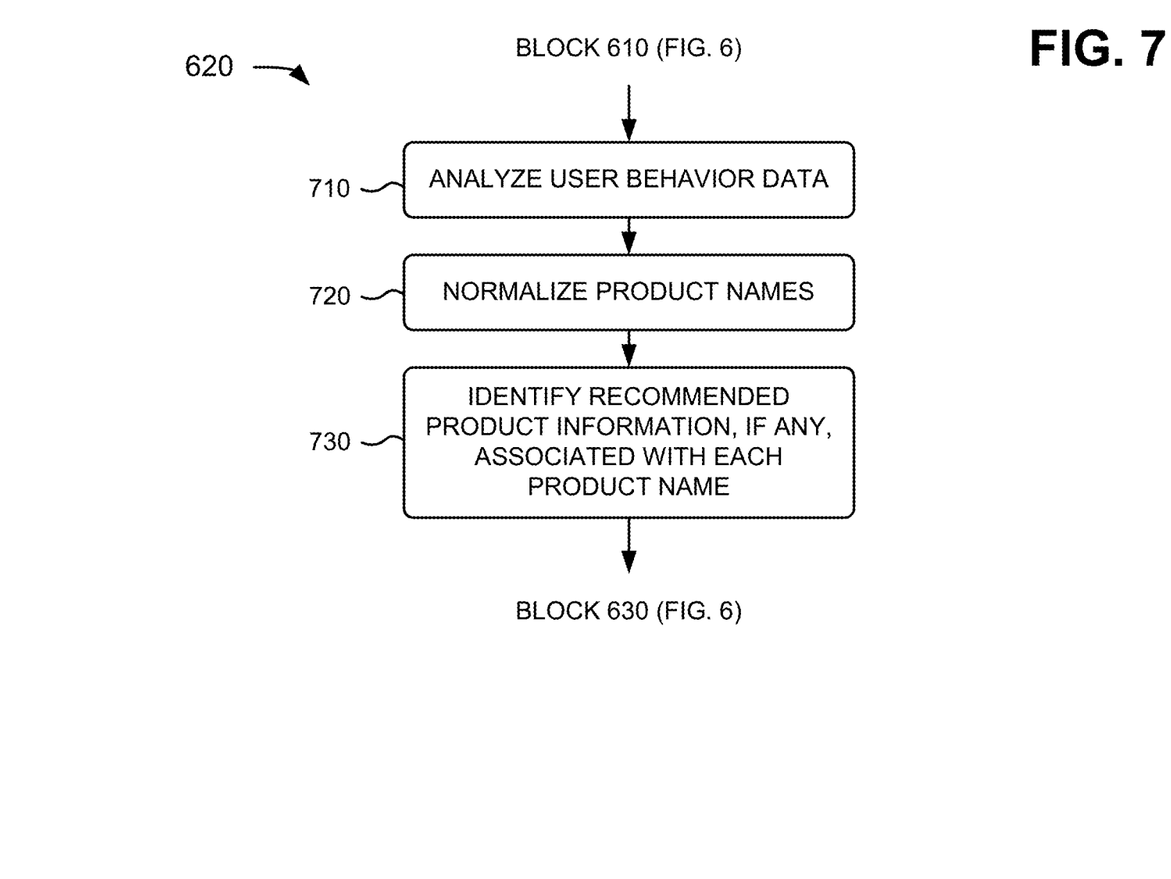

FIGS. 6 and 7 are flowcharts illustrating an exemplary operation for providing product recommendations based on collaborative filtering of user data according to an implementation consistent with the principles of the invention. In one implementation, the exemplary processing of FIGS. 6 and 7 may be performed by server 220 (FIG. 2). In another implementation, the exemplary processing of FIGS. 6 and 7 may be performed by one or more other components, possibly in conjunction with server 220.

Processing may begin with the gathering of user behavior data (block 610) (FIG. 6). As explained above, the user behavior data may include information relating to purchases (conversions) made by users of web retailer servers 230. In one implementation, web retailer servers 230 may supply information relating to purchases (conversions) that occurred on their web sites. The user behavior data may also or alternatively include information relating to what product and/or product information pages users accessed and how long the users spent accessing these pages. In one implementation, software on clients 210 may supply information relating to product and/or product information pages users accessed (e.g., URLs of the product pages) and how long the users spent accessing these pages.

A database that maps products to their product recommendations may be created, such as database 430, based on the user behavior data (block 620). To create the database, the user behavior data may be analyzed (block 710) (FIG. 7) and normalized (block 720), if necessary, to identify recommended product information, if any, associated with each product name (block 730). For example, it may be determined, for each product, what other product(s) users purchased or were interested in (e.g., spent a lot of time accessing) during the same online session.

If, during online sessions with web retailers, users generally purchased product A and B together, product A may be considered a recommended product for product B, and vice versa. If, during online sessions with web retailers, users generally spent a lot of time accessing product A when purchasing product B, product A may be considered a recommended product for product B, and vice versa. If, during online sessions with web retailers, users generally spent a lot of time accessing both products A and B, product A may be considered a recommended product for product B, and vice versa, even if the users generally purchased neither product.

Returning to FIG. 6, the product recommendations may be provided on behalf of the web retailers. For example, the web retailers may insert a piece of code, called a "creative," on their product pages. The creative may include, for example, JavaScript or other code designed to be downloaded and executed by web browsers or other software at clients 210. The code, when executed at a client 210, may cause client 210 to request recommended products from product recommendation system 225. The request may include, for example, an identification of the web retailer and the product (or product page) currently being accessed at the web retailer. In response, product recommendation system 225 may transmit product recommendations to client 210. The product recommendations may be provided in conjunction with the product page from the web retailers. For example, the product recommendations may be integrated and displayed with the product page or provided for display within a pop-up window, or the like, in conjunction with the product page.

The product recommendations provided in conjunction with a product page may include relevant product recommendations. By "relevant" it is meant those recommendations that are applicable not only to the product on the product page, but also to the web retailer selling the product (e.g., it would not be useful to recommend products that the web retailer does not sell). The product associated with a product page may be determined, for example, by crawling the web site of the web retailer and associating the URL of the page with the name of the product. A list of the products that the web retailer sells can also be determined, for example, by crawling the web site of the web retailer or by analyzing a site map or the like.

The product recommendations may appear as, or include, links within the product page. In one implementation, these links may refer to product recommendation system 225. When a user selects (e.g., clicks on) one of these links, product recommendation system 225 may redirect the user's browser to the appropriate product page of the web retailer. In another implementation, these links may include references to both product recommendation system 225 and the appropriate product page of the web retailer. When a user selects (e.g., clicks on) one of these links, the product page may be displayed to the user and product recommendation system 225 may be sent information informing product recommendation system 225 that the link was selected. In either situation, product recommendation system 225 may, in some possible implementations, use the user link selection as a basis for charging the web retailer. Other techniques for charging the web retailer are, of course, possible. Such techniques may include charging the web retailer when recommended products are actually purchased or placed in a shopping cart or charging the web retailer a flat rate for the product recommendation service.

EXAMPLE

Figure 8:
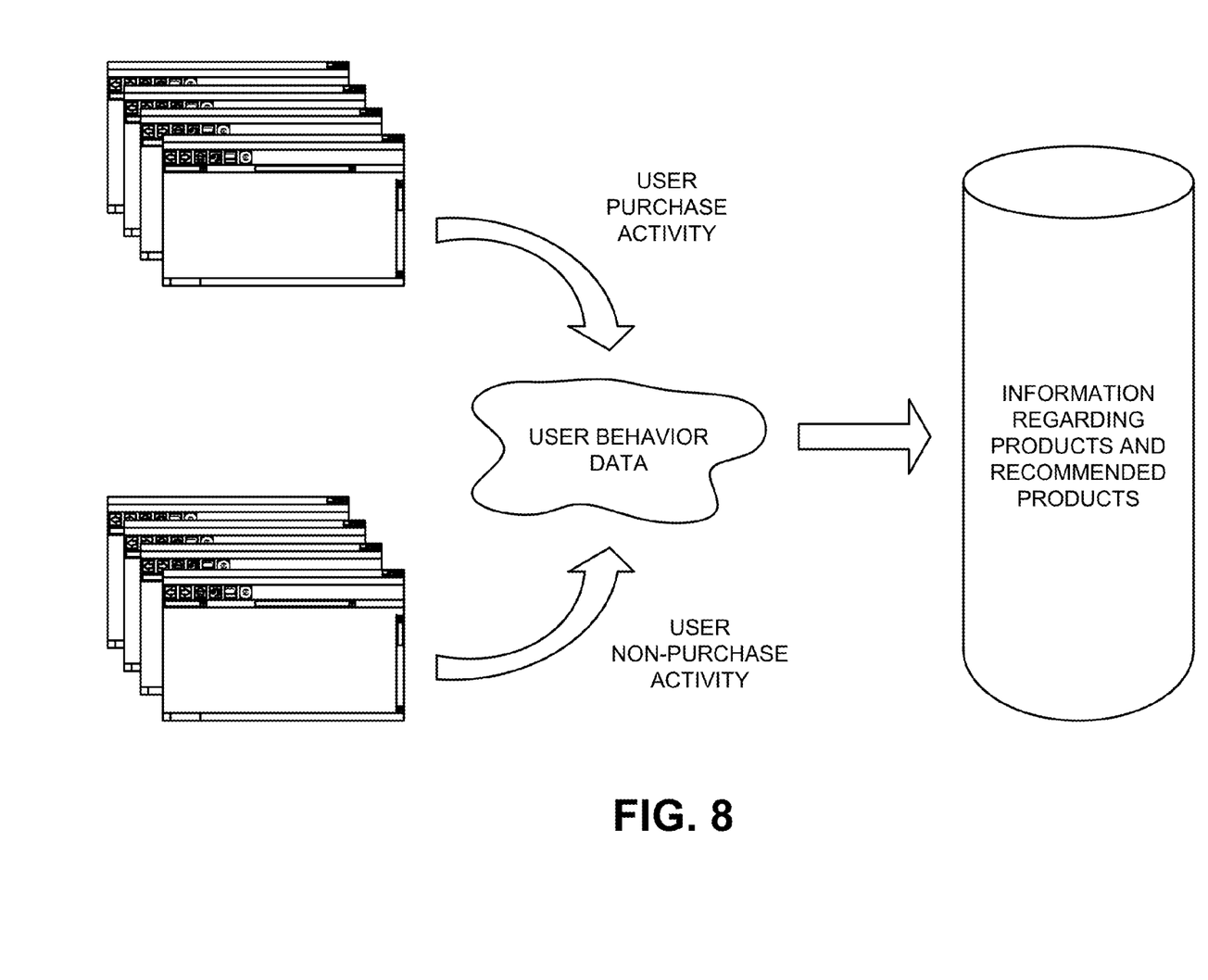
FIGS. 8-11 are diagrams that illustrate exemplary processing according to an implementation consistent with the principles of the invention.

FIGS. 8-11 are diagrams that illustrate exemplary processing according to an implementation consistent with the principles of the invention. As shown in FIG. 8, user purchase activity and user non-purchase activity (e.g., user browsing activity) may be collected as user behavior data. The user behavior data may be analyzed to form a database that maps products to recommended products.

Figure 9:
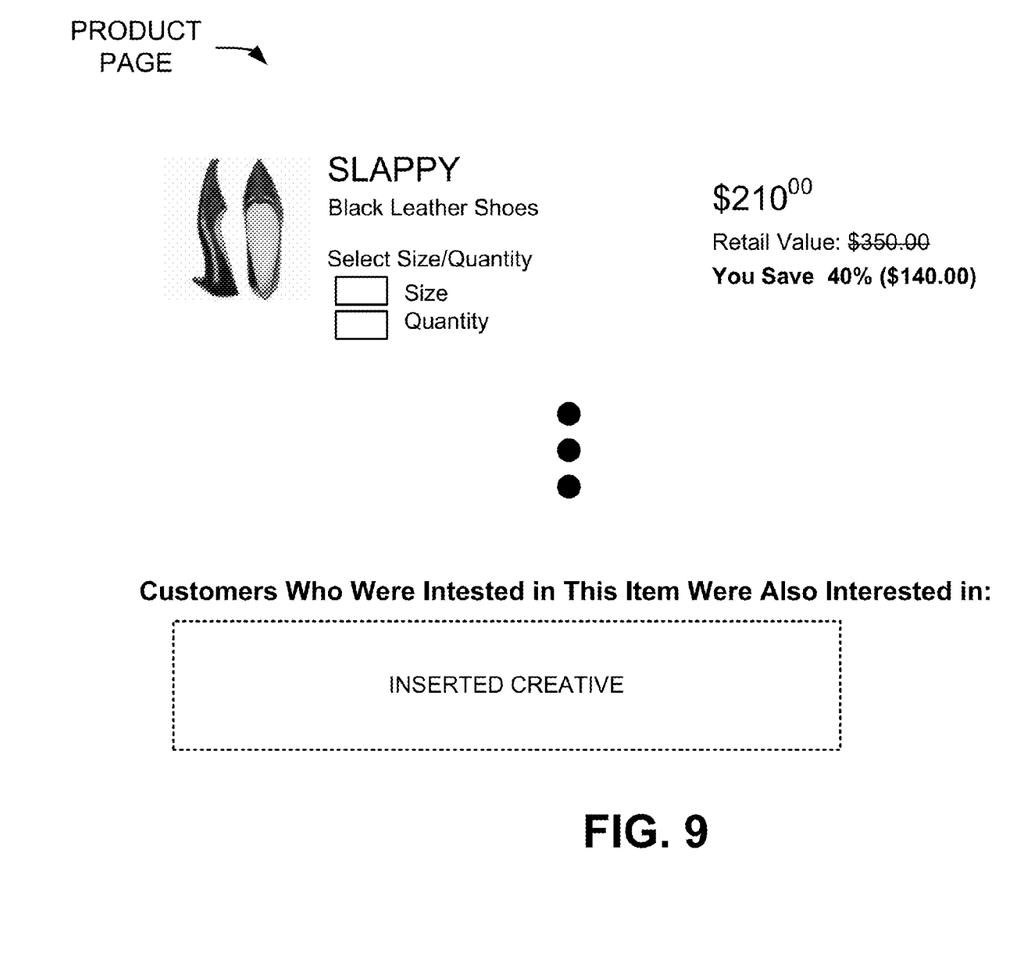

As shown in FIG. 9, assume that a web retailer (momandpopclothingstore.com) sells men's and women's clothing online To obtain product recommendations, the web retailer may coordinate with server 220 (FIG. 2) (or an operator of server 220) to obtain a block of code (e.g., a creative) to insert in the product pages on its web site. The web retailer may insert the creative in its product pages. As shown in FIG. 9, the web retailer inserted a creative on a product page associated with Slappy black leather shoes.

Figure 10:
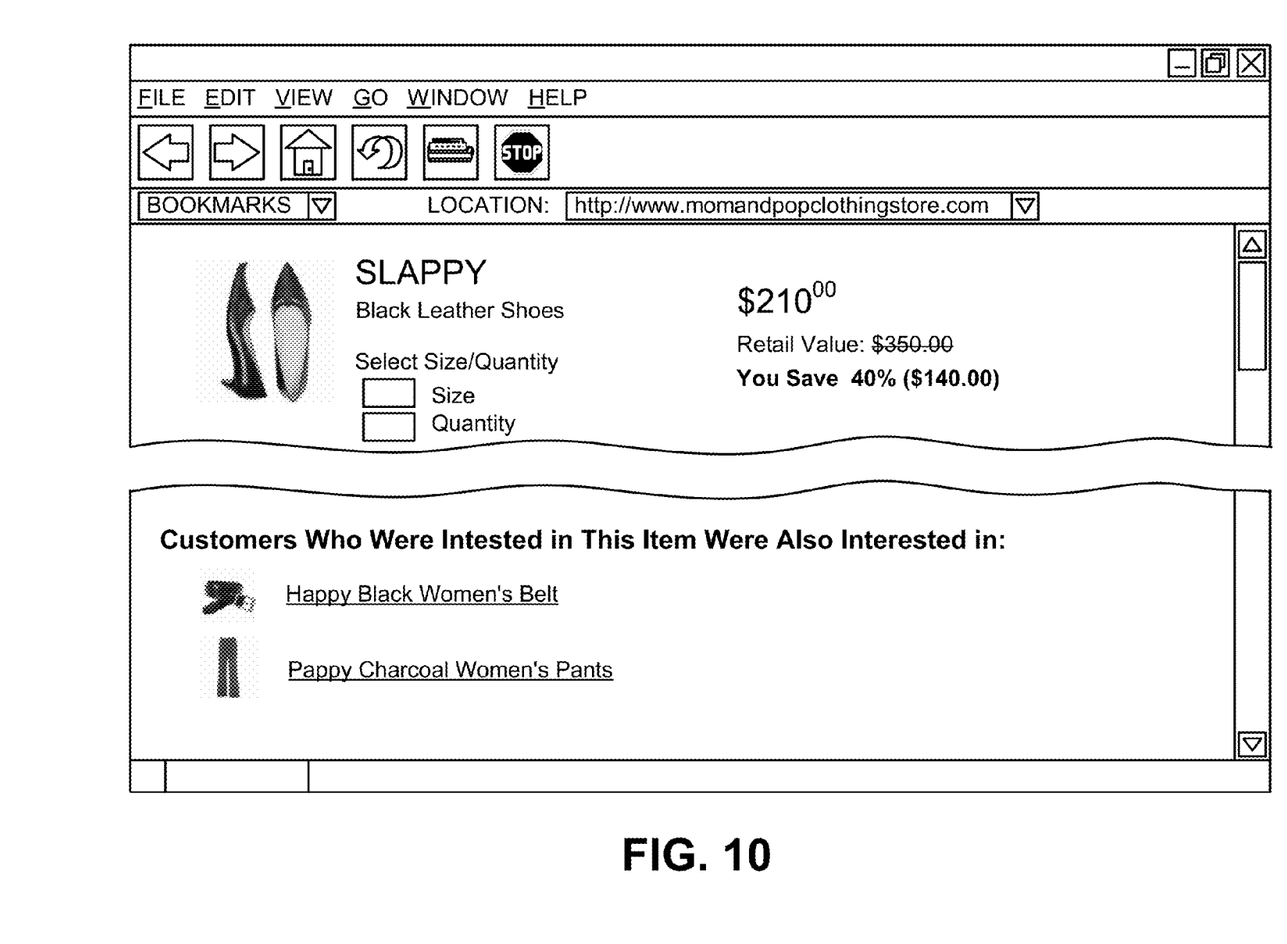

As shown in FIG. 10, in one implementation, when a user thereafter accesses the product page relating to Slappy black leather shoes on the web retailer's web site, the product page may provide product recommendations. In this implementation, for example, the user is informed that customers who were interested in this item (Slappy black leather shoes) were also interested in a Happy black women's belt and Pappy charcoal women's pants.

Figure 11:
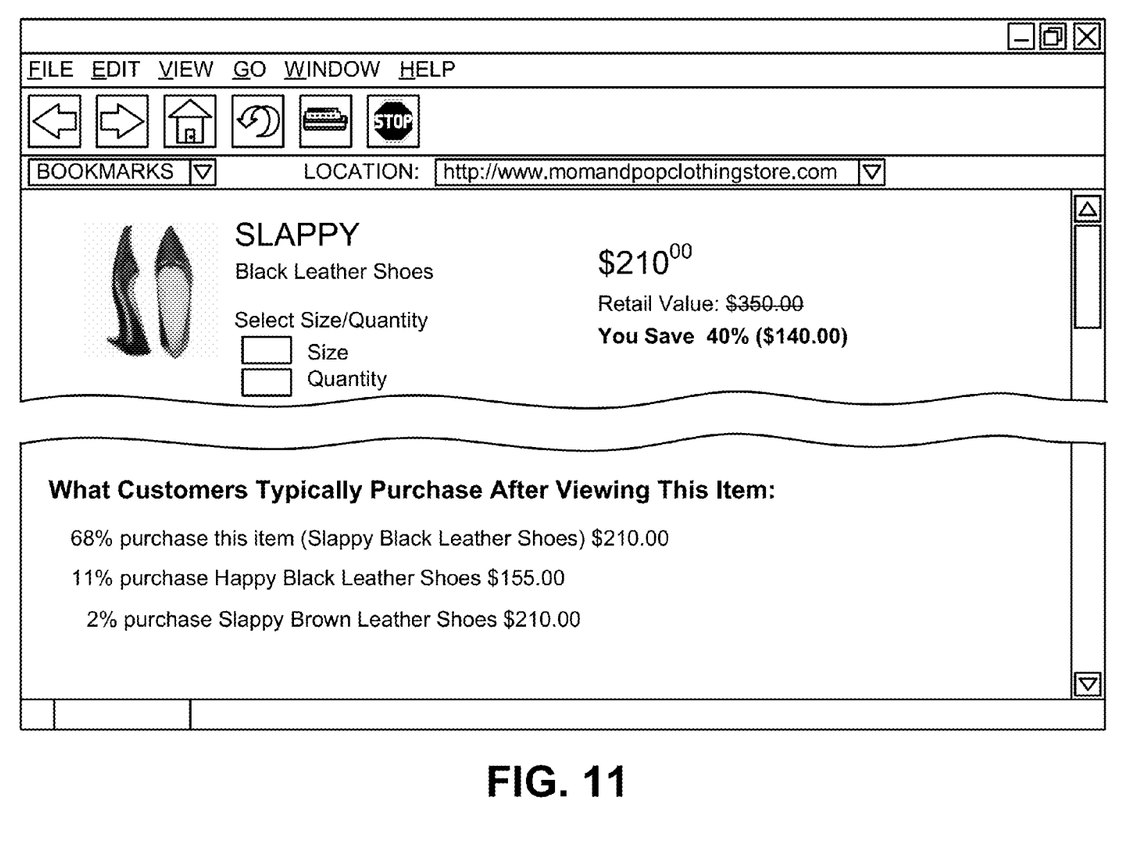

As shown in FIG. 11, in another implementation, when a user thereafter accesses the product page relating to Slappy black leather shoes on the web retailer's web site, the product page may provide product recommendations. In this implementation, for example, the user is informed of what customers typically purchased after viewing this item (Slappy black leather shoes). As shown in FIG. 11, 68% of customers purchased Slappy black leather shoes after viewing the product page associated with Slappy black leather shoes; 11% of customers purchased Happy black leather shoes after viewing the product page associated with Slappy black leather shoes; and 2% of customers purchased Slappy brown leather shoes after viewing the product page associated with Slappy black leather shoes.

CONCLUSION

Implementations consistent with the principles of the invention may leverage user behavior information associated with a group of web retailers and/or non-web retailers to provide product recommendations to customers on a product page of a web retailer that may not have the customer base or the technology to provide useful product recommendations itself.

The foregoing description of implementations consistent with the principles of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 7, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by at least one of one or more devices, information identifying a plurality of items that are related to an item available via a web site,
      the information identifying the plurality of items being received from a plurality of servers associated with a plurality of web sites,
      the plurality of web sites being different than the web site;
   identifying, by at least one of the one or more devices, one or more items, of the plurality of items, that are offered for sale via the web site; and
   providing, by at least one of the one or more devices, a recommendation for the item available via the web site based on the identified one or more items that are offered for sale via the web site,
      the recommendation including information identifying the one or more items that are offered for sale via the web site.

2. The method of claim 1, where the plurality of servers includes one or more servers that provide information identifying items for sale or for rent,
   the information identifying the plurality of items including the information identifying the items for sale or for rent, and
   identifying the one or more items that are offered for sale via the web site including:
      identifying the one or more items as recommended for the item available via the web site, based on the information identifying the items offered for sale or for rent.

3. The method of claim 2, where the items offered for sale or for rent include at least one of:
   one or more products,
   one or more services, or
   information, and
   the information identifying the items offered for sale or for rent indicating that the item, available via the web site, was purchased with at least one of the one or more products or the one or more services.

4. The method of claim 1, where the plurality of servers includes one or more servers that provide information identifying items that are not offered for sale,
   the information identifying the plurality of items including the information identifying the items that are not offered for sale, and
   identifying the one or more items that are offered for sale via the web site including:
      identifying the one or more items as recommended for the item available via the web site, based on the information identifying the items that are not offered for sale.

5. The method of claim 4, where the information, identifying the items that are not offered for sale, includes information regarding:
   one or more products, or
   one or more services, and
   where the information identifying the items that are not offered for sale indicates that information identifying the item was accessed with information identifying the one or more products or the one or more services.

6. The method of claim 5, where the information regarding the one or more products or the one or more services includes:

reviews of the one or more products or the one or more services, descriptions of the one or more products or the one or more services, or prices of the one or more products or the one or more services.

7. A non-transitory computer-readable medium storing instructions, the instructions comprising:
a plurality of instructions which, when executed by one or more processors, cause the one or more processors to:
receive information identifying a plurality of items that are related to an item available via a web site,
the information identifying the plurality of items being received from a plurality of entities associated with a plurality of web sites,
the plurality of web sites being different than the web site;
identify one or more first items, of the plurality of items, that are offered for sale via the web site,
the plurality of items including one or more second items that are not offered for sale via the web site; and
provide a recommendation for the item available via the web site based on the one or more first items that are offered for sale via the web site,
the recommendation including information identifying the one or more first items that are offered for sale via the web site.

8. The non-transitory computer-readable medium of claim 7, where the plurality of entities include at least one of:
one or more web retailers, or
one or more non-web retailers.

9. The non-transitory computer-readable medium of claim 7, where the information identifying the plurality of items includes information indicating that a plurality of users spent a particular amount of time accessing web pages related to the plurality of items and the item available via the web site.

10. The non-transitory computer-readable medium of claim 7, where the plurality of web sites are associated with one or more servers that provide information identifying items for sale or for rent,
the information identifying the plurality of items including the information identifying the items for sale or for rent, and
where one or more instructions, of the plurality of instructions, to identify the one or more first items include:
one or more instructions to identify the one or more first items as recommended for the item available via the web site, based on the information identifying the items offered for sale or for rent.

11. The non-transitory computer-readable medium of claim 10, where the items offered for sale or for rent include at least one of:
one or more products,
one or more services, and
the information identifying the items offered for sale or for rent indicating that the item, available via the web site, was purchased with at least one of the one or more products or the one or more services.

12. The non-transitory computer-readable medium of claim 7, where the plurality of web sites are associated with one or more servers that provide information identifying items that are not offered for sale,
the information identifying the plurality of items including the information identifying the items that are not offered for sale, and
where one or more instructions, of the plurality of instructions, to identify the one or more first items include:
one or more instructions to identify the one or more first items as recommended for the item available via the web site, based on the information identifying the items that are not offered for sale.

13. The non-transitory computer-readable medium of claim 12, where the information, identifying the items that are not offered for sale, includes information regarding:
one or more products, or
one or more services, and
where the information identifying the items that are not offered for sale indicates that information identifying the item was accessed with information identifying the one or more products or the one or more services.

14. The non-transitory computer-readable medium of claim 13, where the information regarding the one or more products or the one or more services includes:
reviews of the one or more products or the one or more services,
descriptions of the one or more products or the one or more services, or
prices of the one or more products or the one or more services.

15. One or more devices comprising:
a memory to store instructions; and
one or more processors to execute the instructions to:
receive information identifying a plurality of items that are related to an item available via a web site,
the information identifying the plurality of items being received from a plurality of entities associated with a plurality of web sites,
the plurality of web sites being different than the web site;
identify one or more first items, of the plurality of items, that are offered for sale via the web site,
the plurality of items including one or more second items that are not offered for sale via the web site; and
provide a recommendation for the item available via the web site based on the one or more first items that are offered for sale via the web site,
the recommendation including information identifying the one or more first items that are offered for sale via the web site.

16. The one or more devices of claim 15, where the one or more processors are further to:
receive, from another device, a request that includes information identifying the item,
where, when providing the recommendation, the one or more processors are to:
provide the recommendation, to the other device, based on receiving the request.

17. The one or more devices of claim 15, where the information identifying the plurality of items includes information indicating that a plurality of users spent a particular amount of time accessing, during a particular online session, documents related to:
the plurality of items, and
the item available via the web site.

18. The one or more devices of claim 15, where the plurality of web sites are associated with one or more servers that provide information identifying items for sale or for rent,
the information identifying the plurality of items including the information identifying the items for sale or for rent, and where, when identifying the one or more first items that are offered for sale via the web site, the one or more processors are further to:
identify the one or more first items as recommended for the item available via the web site, based on the information identifying the items offered for sale or for rent.

19. The one or more devices of claim 18, where the items offered for sale or for rent include at least one of:
one or more products,
one or more services, and
where the information identifying the items offered for sale or for rent indicates that the item, available via the web site, was purchased with at least one of the one or more products or the one or more services.

20. The one or more devices of claim 15, where the plurality of web sites are associated with one or more servers that provide information identifying items that are not offered for sale,
the information identifying the plurality of items including the information identifying the items that are not offered for sale, and
where, when identifying the one or more first items that are offered for sale via the web site, the one or more processors are further to:
identify the one or more first items as recommended for the item available via the web site, based on the information identifying the items that are not offered for sale.

* * * * *